Oct. 3, 1961  R. V. KIRBY  3,002,327
PNEUMATIC LOADER
Filed Oct. 6, 1959  3 Sheets-Sheet 3

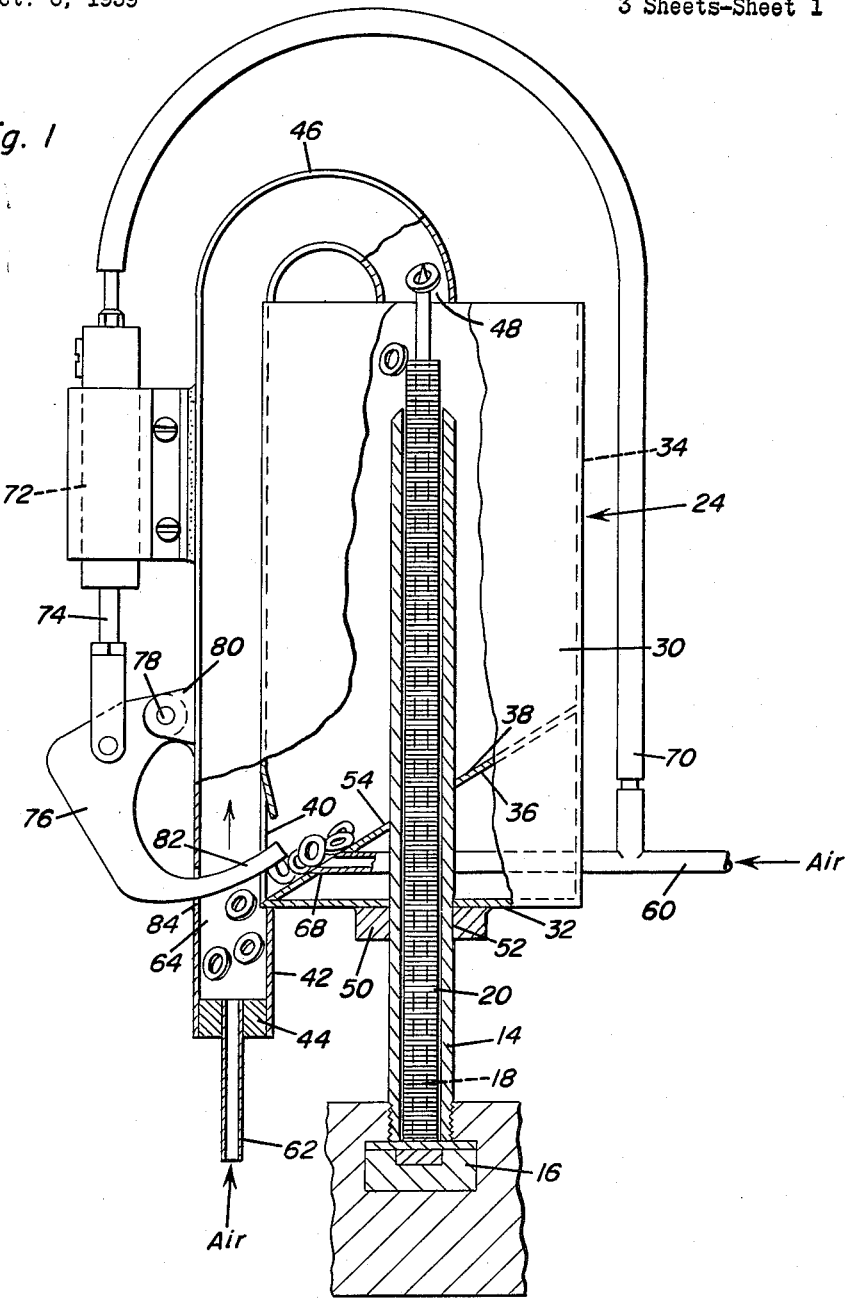

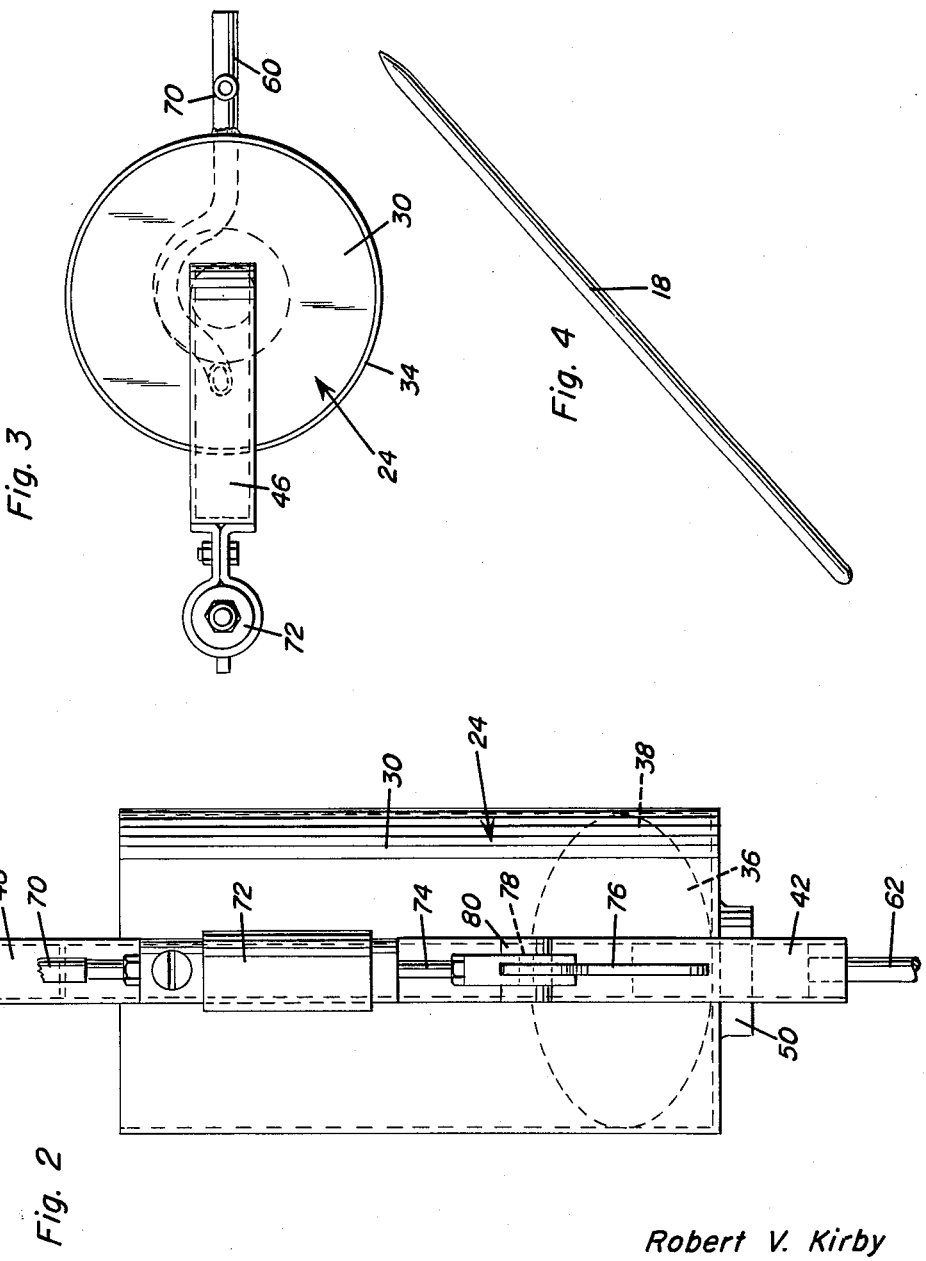

Robert V. Kirby
INVENTOR.

United States Patent Office 3,002,327
Patented Oct. 3, 1961

3,002,327
PNEUMATIC LOADER
Robert V. Kirby, 957 Magnolia Ave., Bowling Green, Ky.
Filed Oct. 6, 1959, Ser. No. 844,701
8 Claims. (Cl. 53—197)

This invention relates to parts loaders and more particularly to a pneumatic loader.

An object of the invention is to provide an pneumatic loader which is very simple in mechanical construction but very effective in loading small parts so that they may be used subsequently, for instance in a machine.

Briefly, the loader is made of a hopper containing a quantity of small parts, together with a pneumatic system for moving the parts through a predetermined path of travel so that they may be accepted in an orderly fashion.

Although the invention is capable of numerous embodiments, a typical embodiment is made of a hopper together with an air circuit having two phases. One phase of the air circuit includes a main air supply for blowing the parts to a loading station, for instance a rod. Further, the type of part handled by the loader can be varied, but to demonstrate the principles of the invention washers are discussed herein. When washers are used, the loading member may be a rod which is ringed by the washers as they are blown by the air under pressure from the main supply phase.

Washers are blown from the hopper by a second phase of the pneumatic system and into the air stream of the main supply line. To prevent jamming of the washers as they are discharged from the hopper and into the main supply air stream, an agitator can be used.

The construction is such that any washers which do not fall in such an orientation that they ring the rod, return into the hopper for recycling.

Accordingly, a further object of the invention is to provide a loader for small parts wherein the parts are pneumatically dispatched from a hopper only to be received in a main blast of air which propels the parts through a path of travel such that they are deposited on a rod, in a magazine or in any other orderly grouping for subsequent use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a typical embodiment of the loader, parts being broken away in section to illustrate otherwise obscure detail.

FIGURE 2 is an elevational view of the loader in FIGURE 1.

FIGURE 3 is a top view of the loader.

FIGURE 4 is a perspective view of a rod on which small parts, e.g. washers, are received during the operation of the loader.

Figure 5:
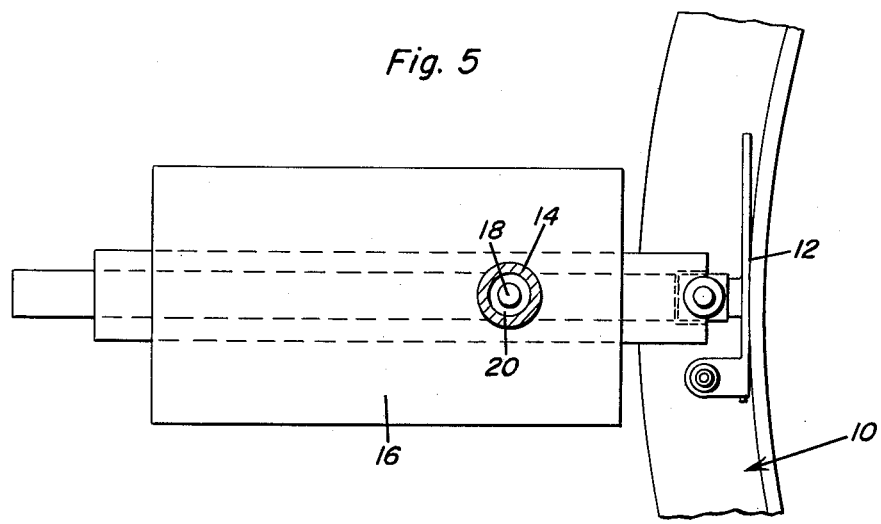
FIGURES 5 and 6 are diagrammatic representations showing the use of washers loaded on a rod by means of the loader of FIGURE 1, FIGURES 5 and 6 merely diagrammatically representing one possible use of the washers.
Figure 6:
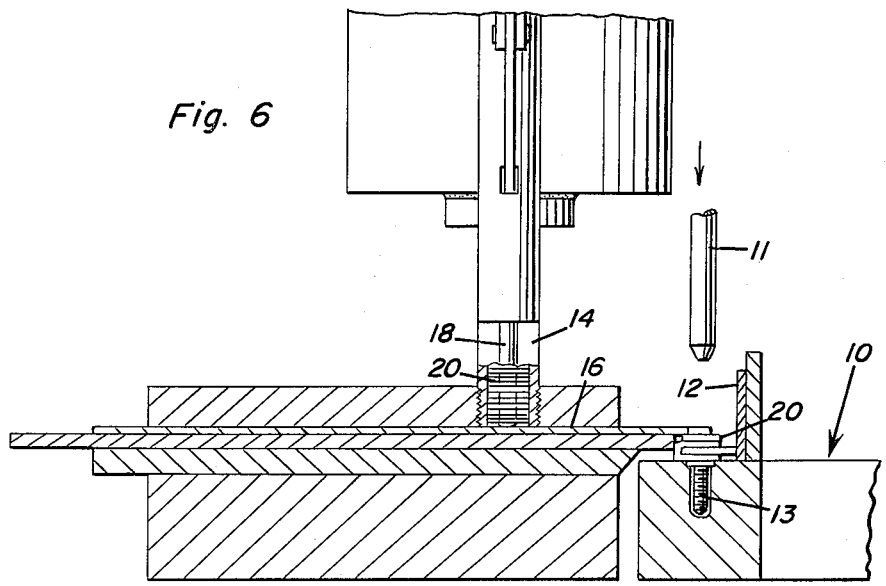

In the accompanying drawings reference is first made to FIGURES 5 and 6 which show part of a machine 10 for manufacturing distributor breaker plates 12 i.e., a part of a distributor for a conventional motor vehicle. FIGURES 5 and 6 are specifically disclaimed as to machine 10 including hammer 11, the breaker plate 12 including bolt 13, and washer feed mechanism 16. FIGURES 5 and 6 are included herein merely to show one possible use of pneumatic loader 24 and how its tube 14 and rod 18 in the tube, plus washers 20 may function with a machine. Machine 10 discloses a use only of the washers on rod 18 after they have been placed on the rod by the operation of loader 24 (FIGURES 1–3) which constitutes one embodiment of the invention. Very briefly, the machine 10 is a conventional machine by which washers 20 are assembled as a part of breaker plates 12 by hammer 11 peening over the top of bolt 13 on which the washers are placed by means of feed mechanism 16. The feed mechanism extracts washers one at a time from the bottom of tube 14. It is to be clearly understood that numerous other uses for parts which are loaded in an orderly fashion, are possible and contemplated by the invention.

Referring now to FIGURES 1–3, feed mechanism 16, tube 14, rod 18 and washers 20 are all shown in FIGURE 1. Loader 24 is also shown in the process of loading washers on rod 18 disposed concentrically in tube 14, the latter forming a magazine. Structurally, loader 24 is made of a hopper 30 having a bottom wall 32 and a side wall 34 attached to the bottom wall. An angulated partition 36 extends from one lower corner of bottom 32 upwardly to a point on the side wall 34 vertically spaced from bottom wall 32 thereby forming an inclined ramp 38 angled downwardly toward the washer discharge opening 40 in the side wall of the hopper.

A tube 42 having a bottom wall 44, is secured to the side wall of hopper 30, and the upper end 46 of the tube is curved in an arc of 180°. The extremity of tube part 46 has a discharge opening 48 into which rod 18 projects and which defines an inlet opening in the upper portion of the hopper 30.

There is a boss 50 secured to bottom wall 32 of the hopper, and it has an aperture 52 therein. The aperture is dimensioned such as to receive tube 14 which extends vertically upwardly into hopper 30, it being necessary that there be provided an opening 54 in partition 36 through which the tube 14 passes. This enables the upper end of rod 18 to occupy opening 48 or terminate slightly below it or as shown in FIGURE 1, slightly penetrate opening 48 and enter tube part 46.

A pneumatic system is operatively connected with the hopper and tube 42. The pneumatic system includes one or two sources of air under pressure depending on design factors. If a single source of air under pressure is used, it has two air lines 60 and 62 extending therefrom, with the air line 62 providing the main air blast. Line 62 enters the bottom of tube 42 and directs a blast of air upwardly through the air chamber 64 defined by tube 44, and past discharge opening 40. Line 60 is registered with an opening 68 in partition wall 36, and it is laterally opposed to opening 40 so that the force of the air under pressure through line 60 enters the lower part of hopper 30 and is directed to blow the small parts e.g. washers 20, from the bottom of the hopper through opening 40 and into chamber 64. A branch line 70 extends from line 60 and is operatively connected with a conventional pneumatic cylinder 72. A "clippard" cylinder is selected since the application of air under pressure therein will cause a reciprocatory movement of piston rod 74 to which agitator 76 is connected. The agitator is in the form of an arm mounted on a pivot 78 at one end, the pivot carried by bracket which is welded or otherwise secured to the side wall of tube 42. Arm 76 has an end part 82 extending through an aperture 84 in the side wall of tube 42 and operable through the washer discharge opening 40 in the side wall of hopper 30. The purpose of the agitator is to prevent jamming at the discharge opening 40 portion of hopper 30.

In use and operation the hopper 30 is loaded with small parts, for instance washers, and tube 14 is initially manually loaded with washers to keep rod 18 erect in tube 14. The washers may then be extracted individually from the bottom of tube 14, for example by mechanism 16 which is representative of any suitable means to serve the purpose and which forms no part of the invention. Meanwhile, upon application of air under pressure in lines 60 and 62 the following takes place: the washers at the bottom of hopper 30 are blown through opening 40 and enter the air chamber 64. They are picked up by the main air stream in tube 42 and carried upwardly around part 46 of tube 42. A number of the washers will ring the rod 18, one for each washer removed from the bottom of tube 14, but some will return to the hopper. This procedure is continued to keep the rod and tube in tube 14 full. It is preferred that the air pressure application be intermittent, for instance, it may be cycled with the removal of each washer 20 from tube 14.

Continually during the operation of the hopper, the agitators function to prevent jamming of the washers at the discharge opening 40. Although "washers" are mentioned as a typical small part to be used with the invention, it is to be clearly understood that the principles of the invention are applicable equally well with other small parts i.e. parts capable of being pneumatically dispatched through the cycle described herein.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A pneumatic loader for parts comprising a hopper having an inlet opening for receiving a supply of parts disposed in random positions relative to each other, air passage means having one end communicating with said hopper, a discharge opening in said hopper communicating with the other end of said air passage means, said hopper and air passage means defining a pneumatic circuit for recirculating at least a portion of the airflow passing through said air passage means and for effecting circulation of at least a portion of the supply of parts in said hopper out of said discharge opening and in said inlet opening, an air line communicating with said one end of said air passage means and directed to blow parts issuing from said discharge opening through said air passage means and back into said hopper, and means in said pneumatic circuit for receiving and collecting a portion of said parts passing therethrough in a predetermined pattern.

2. The combination of claim 1 including a mechanical agitator operatively connected with said hopper and having a portion for agitating the parts issuing from said discharge opening to prevent jamming of parts at said discharge opening of said hopper.

3. The combination of claim 2 wherein said mechanical agitator includes motor means comprising an air actuated pneumatic cylinder.

4. The combination of claim 1 including feed means adapted to intermittently dispense a predetermined number of said collected parts from said receiving and collecting means.

5. The combination of claim 1 including a second air line having a discharge end in said hopper and directed toward said discharge opening to blow the parts from said hopper and into said air passage means.

6. The combination of claim 1 wherein said means to receive the parts includes a rod and wherein said parts are washers which are adapted to ring said rod, said rod being disposed upright in said hopper, the discharge end of said air passage means being aligned with the upper end of said rod.

7. The loader of claim 1 wherein said hopper has a bottom wall which is angled downwardly toward said discharge opening of said hopper and through which said first air line extends.

8. The loader of claim 1 wherein said means to receive the parts include a rod and wherein said parts are washers which are adapted to ring said rod.

References Cited in the file of this patent

UNITED STATES PATENTS 1,060,515     Vance _____ Apr. 29, 1913